(12) United States Patent
Kawai et al.

(10) Patent No.: US 8,499,541 B2
(45) Date of Patent: Aug. 6, 2013

(54) METHOD FOR STARTING PREMIXED COMBUSTION IN COMBUSTOR FOR TWO-SHAFT GAS TURBINE

(75) Inventors: Ryo Kawai, Hitachinaka (JP); Hidetaro Murata, Hitachi (JP); Takeo Saito, Hitachinaka (JP); Nobuaki Kizuka, Hitachinaka (JP); Kenji Nanataki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 53 days.

(21) Appl. No.: 13/069,022

(22) Filed: Mar. 22, 2011

(65) Prior Publication Data

US 2011/0167833 A1 Jul. 14, 2011

Related U.S. Application Data

(63) Continuation of application No. 12/687,228, filed on Jan. 14, 2010.

(30) Foreign Application Priority Data

Jan. 21, 2009 (JP) ................................. 2009-011052

(51) Int. Cl.
*F02C 9/26* (2006.01)
(52) U.S. Cl.
USPC ........ 60/39.281; 60/39.23; 60/39.27; 60/773; 60/774; 60/791

(58) Field of Classification Search
USPC .................. 60/39.27, 39.281, 773, 774, 791, 60/796, 39.23
See application file for complete search history.

(56) References Cited

U.S. PATENT DOCUMENTS

| 3,255,586 A | * | 6/1966 | Hennig et al. | .................. 60/773 |
| 5,303,542 A | | 4/1994 | Hoffa | |
| 5,339,620 A | * | 8/1994 | Ikeda et al. | ..................... 60/773 |
| 5,899,074 A | * | 5/1999 | Komatsu et al. | ................ 60/737 |

FOREIGN PATENT DOCUMENTS

| JP | 7-280267 | 10/1995 |
| JP | 2000-274689 A | 10/2000 |

* cited by examiner

*Primary Examiner* — Phutthiwat Wongwian
*Assistant Examiner* — Steven Sutherland
(74) *Attorney, Agent, or Firm* — Mattingly & Malur, PC

(57) ABSTRACT

A two-shaft gas turbine is capable of starting premixed combustion without extinguishing a flame. The two-shaft gas turbine includes a combustor and a gas generator controller. The combustor has a premix burner that includes combustion regions in which premixed combustion is to be carried out individually. The gas generator controller controls the combustor. In a method for starting the premixed combustion in the combustor, the gas generator controller selects at least one of the combustion regions in which the premixed combustion is to be carried out, on the basis of a fuel-air ratio, and starts premix combustion in the selected combustion region or separately in each of the selected combustion regions. Further, as the fuel-air ratio is increased, the controller increases the number of the selected region in which the premixed combustion is carried out.

1 Claim, 5 Drawing Sheets

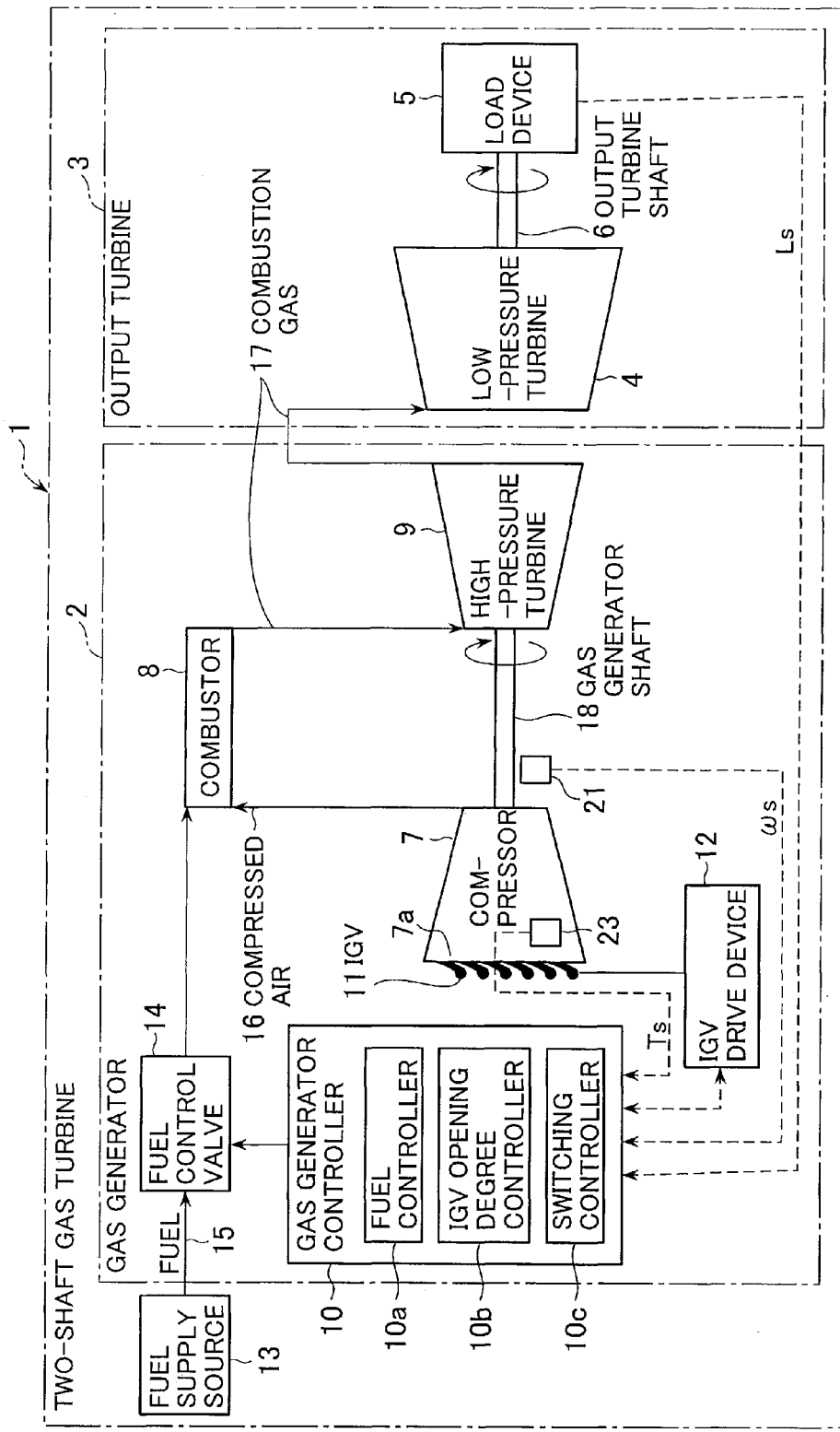

METHOD FOR STARTING PREMIXED COMBUSTION IN COMBUSTOR FOR TWO-SHAFT GAS TURBINE

CROSS-REFERENCES

This is a continuation application of U.S. Ser. No. 12/687,228, filed Jan. 14, 2010.

This application claims priority to JP 2009-011052, filed Jan. 21, 2009.

BACKGROUND OF THE INVENTION

1. Field of the Invention

The present invention relates to a two-shaft gas turbine and a method for starting premixed combustion in a combustor for a two-shaft gas turbine.

2. Description of the Related Art

A general two-shaft gas turbine has a gas generator and a low-pressure turbine (power turbine). The gas generator includes a compressor, a combustor and a high-pressure turbine. The low-pressure turbine is connected to a load device. The gas generator has a rotary shaft separated from a rotary shaft of the low-pressure turbine.

The compressor included in the gas generator compresses air. In the combustor, the compressed air and fuel are mixed and burned to form a combustion gas.

After the high-pressure turbine is driven to rotate and thereby generate a drive force for the compressor, the combustion gas formed in the combustor is transferred to the low-pressure turbine. Then, the low-pressure turbine is driven to rotate.

In the conventional combustor included in the gas turbine, both diffusion combustion and premixed combustion are carried out. In the diffusion combustion, fuel and air are burned while being mixed with each other. In the premixed combustion, fuel and air are premixed and then burned. The diffusion combustion is carried out until a load is increased from zero to a certain level. The premixed combustion starts when the load reaches the certain level. This combustion process stabilizes a flame in the combustor and suppresses generation of a nitrogen oxide (NOx).

JP-07-280267-A discloses a combustor including a burner for diffuse combustion and a burner for premixed combustion. The burner for premixed combustion is arranged around the burner for diffusion combustion. The burner for premixed combustion includes a plurality of regions arranged in a circumferential direction of the burner for diffusion combustion. In the combustor, the premixed combustion can be carried out separately in each of the regions.

In the combustor described in JP-07-280267-A, the diffusion combustion is carried out until a load is increased from zero to a certain level. Then, a flame is stabilized in the combustor. After that, the premixed combustion starts on the basis of the amount of fuel that is to be introduced into the combustor. The amount of the fuel is increased with the increase in the load. A region in which the premixed combustion is to be carried out is selected from the plurality of regions on the basis of the amount of the fuel. The premixed combustion starts separately in each selected region. The number of the selected regions in which the premixed combustion is carried out is increased with the increase in the amount of the fuel that is to be introduced into the combustor. This method suppresses generation of a nitrogen oxide.

A region in which the premixed combustion is to be carried out is selected from the plurality of regions on the basis of the amount of the fuel. The number of the selected regions in which the premixed combustion is carried out is increased with the increase in the amount of the fuel that is to be introduced into the combustor.

SUMMARY OF THE INVENTION

In the conventional two-shaft gas turbine, however, the rotational rate of the rotary shaft of the gas generator varies according to the load. In addition, the opening degree of an air intake of the compressor is changed according to the rotational rate of the rotary shaft of the gas generator to control the amount of air that is to be introduced into the combustor. When a region in which the premixed combustion is to be carried out is selected on the basis of the amount of the fuel, and the ratio of the amount of the fuel that is to be introduced into the combustor to the amount of air that is to be introduced into the combustor is changed, the premixed combustion may not be sufficiently carried out. Thus, a flame may be extinguished.

An object of the present invention is to provide a two-shaft gas turbine that is capable of starting premixed combustion without extinguishing a flame, and a method for starting the premixed combustion in a combustor for the two-shaft gas turbine.

To solve the aforementioned problem, the present invention provides the two-shaft gas turbine and the method for starting the premixed combustion in the combustor for the two-shaft gas turbine. The two-shaft gas turbine includes a combustor having a burner for premixed combustion. The two-shaft gas turbine is capable of starting premixed combustion separately in each of several selected regions included in the burner for premixed combustion. In addition, the two-shaft gas turbine selects at least one of the regions on the basis of a fuel-air ratio (ratio of the amount of fuel that is introduced into the combustor to the amount of air that is introduced into the combustor). The premixed combustion starts in the selected region or starts separately in each of the selected regions.

The present invention provides the two-shaft gas turbine that is capable of starting a premixed combustion without extinguishing a flame, and the method for starting the premixed combustion in the combustor.

BRIEF DESCRIPTION OF THE DRAWINGS

FIG. 1 is a schematic diagram showing the configuration of a two-shaft gas turbine.

DESCRIPTION OF THE PREFERRED EMBODIMENTS

An embodiment of the present invention is described below with reference to the accompanying drawings.

Figure 2A:
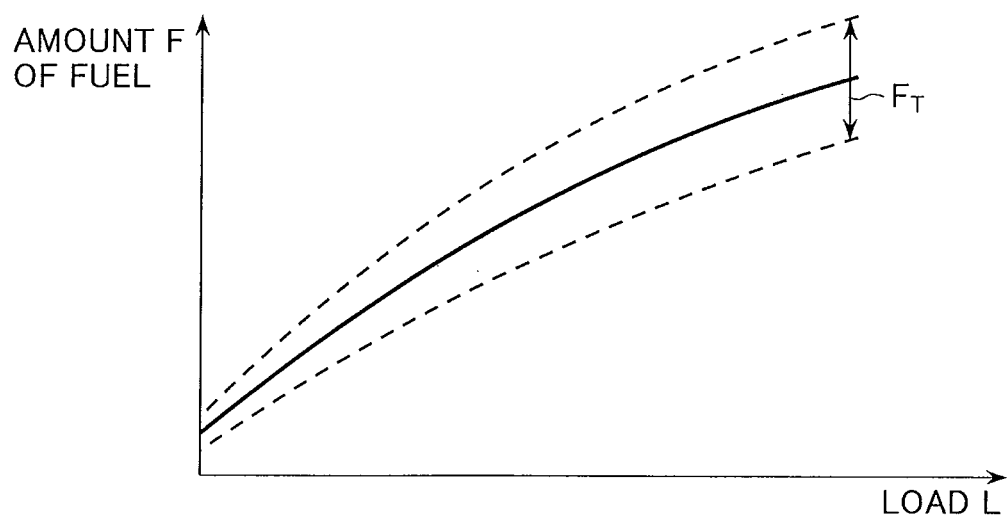
FIG. 2A is a graph showing the relationship between a load applied to the two-shaft gas turbine and fuel that is to be introduced into a combustor.
Figure 2B:
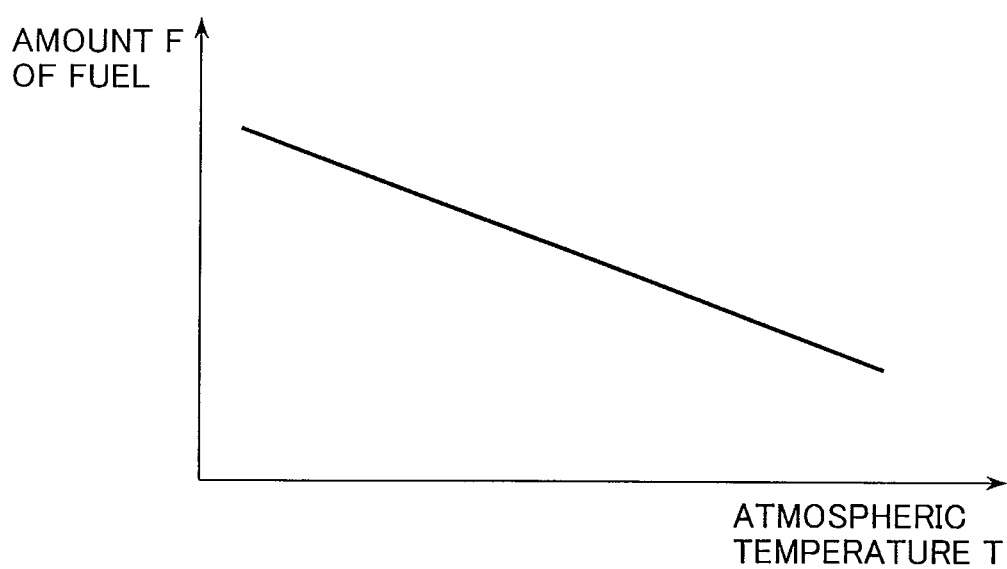
FIG. 2B is a graph showing the relationship between the temperature of an atmosphere and the fuel that is to be introduced into the combustor.

In FIG. 2A, a load L applied to a two-shaft gas turbine is plotted along a horizontal axis of the graph, and the amount F of fuel that is to be introduced into a combustor is plotted along a vertical axis of the graph. In FIG. 2B, the atmospheric temperature T is plotted along a horizontal axis of the graph, and the amount F of the fuel that is to be introduced into the combustor is plotted along a vertical axis of the graph.

Figure 3A:
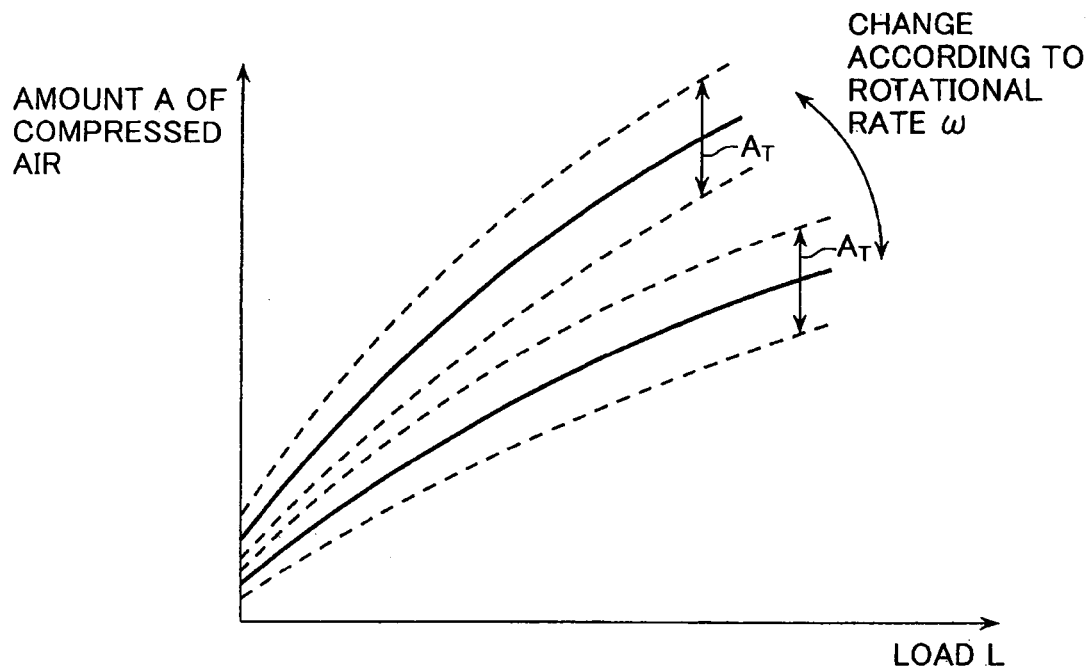
FIG. 3A is a graph showing the relationship between the load applied to the two-shaft gas turbine and the amount of air that is to be introduced into the combustor.
Figure 3B:
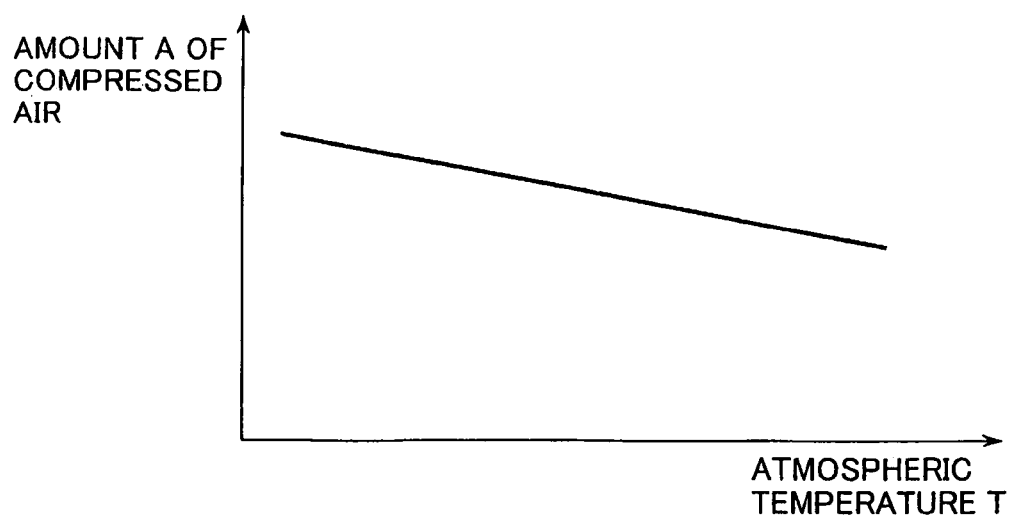
FIG. 3B is a graph showing the relationship between the amount of the air that is to be introduced into the combustor and the temperature of the atmosphere.

In FIG. 3A, the load L is plotted along a horizontal axis of the graph, and the amount A of air that is to be introduced into the combustor is plotted along a vertical axis of the graph. In FIG. 3B, the atmospheric temperature T is plotted along a horizontal axis of the graph, and the amount of the air that is to be introduced into the combustor is plotted along a vertical axis of the graph.

In FIG. 1, reference numeral 1 denotes the two-shaft gas turbine. The two-shaft gas turbine 1 includes a gas generator 2 and an output turbine 3.

The output gas turbine 3 has a low-pressure turbine 4 and a load device 5. The low-pressure turbine 4 has an output turbine shaft 6 connected to the load device 5. The load device 5 is an electric generator, for example. The load device 5 outputs a load state signal Ls that indicates the state of the load. The state of the load includes the amount (hereinafter also referred to a load L) of the load.

In FIG. 1, reference numeral 8 denotes the combustor. The gas generator 2 includes a compressor 7, the combustor 8, a high-pressure turbine 9 and a gas generator controller 10.

The compressor 7 takes air from the atmosphere present outside the compressor 7, and then compresses the air. In FIG. 1, reference numeral 16 denotes the compressed air. The compressor 7 has an inlet guide vane (IGV) 11 on its air intake side, and also has an air intake 7a on the air intake side.

The gas generator 2 has an IGV drive device 12 which drives IGV 11. The IGV 11 changes the opening degree of the air intake 7a of the compressor 7. Thus, the IGV 11 is driven to control the amount of air that is to be introduced into the compressor 7.

The two-shaft gas turbine 1 has a fuel supply source 13. The gas generator 2 has a fuel control valve 14. In FIG. 1, reference numeral 15 denotes fuel. The fuel 15 is supplied from the fuel supply source 13 through the fuel control valve 14 to the combustor 8. The air 16 compressed by the compressor 7 is introduced into the compressor 8 in which the fuel 15 and the compressed air 16 are mixed and burned to form a combustion gas 17. The combustor 8 is described later in detail.

The high-pressure turbine 9 has a gas generator shaft 18 that is a rotor. The high-pressure turbine 9 drives and rotates the gas generator shaft 18 by means of the combustion gas 17 formed in the combustor 8, and transfers the rotation of the gas generator shaft 18 to the compressor 7.

The rotation of the gas generator shaft 18 decompresses the combustion gas 17. The decompressed combustion gas 17 is introduced into the low-pressure turbine 4 for driving and rotating the output turbine shaft 6 by means of the combustion gas 17.

The gas generator 2 has a rotational rate detector 21. The rotational rate detector 21 detects a rotational rate ω of the gas generator shaft 18, converts the detected rotational rate ω into a rotational rate signal ωs, and outputs the rotational rate signal ωs to the gas generator controller 10.

The gas generator controller 10 is capable of calculating the rotational rate ω of the gas generator shaft 18 based on the rotational rate signal ωs.

The compressor 7 has an atmosphere temperature detector 23 installed in the air intake 7a and connected to the gas generator controller 10. The atmosphere temperature detector 23 detects the atmospheric temperature T to be introduced into the compressor 7, converts the detected atmospheric temperature T into a temperature signal Ts, and outputs the temperature signal Ts to the gas generator controller 10. The gas generator controller 10 is capable of calculating the atmospheric temperature T based on the temperature signal Ts.

The gas generator controller 10 includes a fuel controller 10a, an IGV opening degree controller 10b and a switching controller 10c.

The fuel controller 10a calculates an appropriate amount (amount F) of the fuel 15 (that is to be introduced into the combustor 8) based on the load state signal Ls transmitted by the load device 5 and the temperature signal Ts transmitted by the atmosphere temperature detector 23, and controls the opening degree of the fuel control valve 14 such that the amount of the fuel 15 to be introduced into the combustor 8 is equal to the calculated amount F.

As described above, the load state signal Ls transmitted by the load device 5 indicates the state (including the amount (load L) of the load) of the load. The gas generator controller 10 is capable of calculating the load L based on the load state signal Ls transmitted by the load device 5.

The two-shaft gas turbine 1 controls the amount F of the fuel 15 (that is to be introduced into the combustor 8) on the basis of the load L.

The appropriate amount F of the fuel 15, which is calculated on the basis of the load L, may be determined by an experiment or the like beforehand.

FIG. 2A shows an appropriate relationship between the load L applied to the two-shaft gas turbine 1 and the amount F of the fuel 15 that is to be introduced into the combustor 8. For example, when the amount F of the fuel 15 is increased with an increase in the load L as shown in FIG. 2A, the fuel controller 10a included in the gas generator controller 10 calculates the load L on the basis of the load state signal Ls transmitted by the load device 5. The fuel controller 10a references the graph shown in FIG. 2 to calculate the appropriate amount F of the fuel 15 on the basis of the calculated load L.

The appropriate amount F of the fuel 15, which is calculated on the basis of the load L, varies according to the atmospheric temperature T. As shown in FIG. 2B, the appropriate amount F of the fuel 15 is reduced as the atmospheric temperature T increases. Therefore, the relationship between the amount F of the fuel 15 and the load L varies within a range Ft shown in FIG. 2A according to the atmospheric temperature T.

The fuel controller 10a included in the gas generator controller 10 calculates the atmospheric temperature T based on the temperature signal Ts transmitted by the atmosphere temperature detector 23. The fuel controller 10a references the graph shown in FIG. 2A to calculate the appropriate amount F of the fuel 15 based on the calculated atmospheric temperature T.

In addition, the fuel controller 10a included in the gas generator controller 10 calculates an appropriate opening degree of the fuel control valve 14 on the basis of the calculated amount F of the fuel 15, and also drives the fuel control valve 14 such that the actual opening degree of the fuel control valve 14 is equal to the calculated opening degree.

The relationship (shown in FIG. 2A) between the load L and the amount F of the fuel, and the relationship (shown in FIG. 2B) between the atmospheric temperature T and the amount F of the fuel 15, may be determined by an experiment or the like and are stored as map data (first map data) in a storage section (not shown).

The fuel controller 10a included in the gas generator controller 10 references the first map data on the basis of the load L and the temperature T to calculate the appropriate amount F of the fuel 15. The load L is calculated on the basis of the load state signal Ls transmitted by the load device 5. The temperature T is calculated based on the temperature signal Ts transmitted by the atmosphere temperature detector 23 of the atmosphere.

Returning back to FIG. 1, the IGV opening degree controller 10b included in the gas generator controller 10 calculates an appropriate amount A of the compressed air 16 to be introduced into the combustor 8, on the basis of the load L, the atmospheric temperature T, and the rotational rate ω of the gas generator shaft 18. The load L is calculated on the basis of the load state signal Ls transmitted by the load device 5. The temperature T is calculated based on the temperature signal Ts transmitted by the atmosphere temperature detector 23. The rotational rate ω is calculated based on the rotational rate signal ωs transmitted by the rotational rate detector 21. The IGV opening degree controller 10b calculates, on the basis of the calculated amount A, the amount of air to be introduced into the compressor 7, and also calculates an appropriate opening degree of the air intake 7a such that the calculated amount of air is introduced into the compressor 7.

The two-shaft gas turbine 1 controls, on the basis of the load L, the amount A of the compressed air 16 that is to be introduced into the combustor 8.

The appropriate amount A of the compressed air 16, which is calculated on the basis of the load L, may be determined by an experiment or the like beforehand.

In the two-shaft gas turbine 1, when the amount A of the compressed air is increased with the increase in the load L as shown in FIG. 3A, For example, the IGV opening degree controller 10b included in the gas generator controller 10 calculates the load L on the basis of the load state signal Ls transmitted by the load device 5. The IGV opening degree controller 10b then references the graph shown in FIG. 3A to calculate the appropriate amount A of the compressed air 16 on the basis of the calculated load L.

The appropriate amount A of the compressed air 16, which is calculated on the basis of the load L, varies according to the atmospheric temperature T. The appropriate amount A of the compressed air 16 is reduced as the atmospheric temperature T increases, as shown in FIG. 3B. The relationship between the load L and the amount A of the compressed air 16 varies in a range At (defined by broken lines shown in FIG. 3A) that varies according to the atmospheric temperature T.

The IGV opening degree controller 10b included in the gas generator controller 10 calculates the atmospheric temperature T based on the temperature signal Ts transmitted by the atmosphere temperature detector 23. Then, the IGV opening degree controller 10b references the graph shown in FIG. 3A to calculate the amount A of the compressed air 16 based on the calculated atmospheric temperature T.

The appropriate amount A of the compressed air 16 varies in response to the rotational rate ω of the gas generator shaft 18. The graph shown in FIG. 3A indicates the relationship between the load L and the appropriate amount A of compressed air 16 (which is determined by the atmospheric temperature T) and which amount A of the compressed air 16 is associated with the rotational rate ω of the gas generator shaft 18. The graph (shown in FIG. 3A) associated with the rotational rate ω of the gas generator shaft 18 is set in the gas generator 2.

The IGV opening degree controller 10b included in the gas generator controller 10 calculates the rotational rate ω of the gas generator shaft 18 based on the rotational rate signal ωs transmitted by the rotational rate detector 21. The IGV opening degree controller 10b references the graph shown in FIG. 3A to calculate the amount A of the compressed air 16 based on the calculated rotational rate ω.

The IGV opening degree controller 10b included in the gas generator controller 10 calculates an appropriate opening degree of the air intake 7a on the basis of the calculated amount A of the compressed air, and also drives the IGV 11 via the IGV drive device 12 such that the actual opening degree of the air intake 7a is equal to the calculated opening degree.

Relationships among the load L, the atmospheric temperature T, the rotational rate ω of the gas generator shaft 18 and the amount A of the compressed air 16 may be determined by an experiment or the like and are stored as map data (second map data) in the storage section (not shown).

The IGV opening degree controller 10b included in the gas generator controller 10 references the second map data to calculate the amount A of the compressed air 16 on the basis of the load L, the atmospheric temperature T, and the rotational rate ω of the gas generator shaft 18. The load L is calculated on the basis of the load state signal Ls transmitted by the load device 5. The temperature T is calculated based on the temperature signal Ts transmitted by the atmosphere temperature detector 23. The rotational rate ω is calculated based on the temperature signal Ts transmitted by the rotational rate detector 21.

Therefore, the two-shaft gas turbine 1 shown in FIG. 1 is capable of controlling the amount F of the fuel 15 to be introduced into the combustor 8, on the basis of the load L and the atmospheric temperature T. In addition, the two-shaft gas turbine 1 is capable of controlling the amount A of the compressed air 16 (that is to be introduced into the combustor 8) on the basis of the load L, the atmospheric temperature T and the rotational rate ω of the gas generator shaft 18.

The ratio of the reduction in the amount F of the fuel 15 to the increase in the atmospheric temperature T is larger than the ratio of the reduction in the amount A of the compressed air 16 to the increase in the atmospheric temperature T. The ratio (hereinafter, also referred to as a fuel-air ratio (F/A)) of the amount F of the fuel 15 (that is to be introduced into the combustor 8) to the amount A of the compressed air 16 (that is to be introduced into the combustor 8) is reduced with the increase in the atmospheric temperature T.

Returning back to FIG. 1, the switching controller 10c included in the gas generator controller 10 calculates the fuel-air ratio (F/A) on the basis of the amount F of the fuel 15 and the amount A of the compressed air 16. The amount F of the fuel 15 is calculated by the fuel controller 10a. The amount A of the compressed air 16 is calculated by the IGV opening degree controller 10b. Then, the switching controller 10c controls, on the basis of the calculated fuel-air ratio (F/A), combustion that is carried out in the combustor 8.

The configuration of the combustor 8 (refer to FIG. 1) is described below.

Figure 4A:
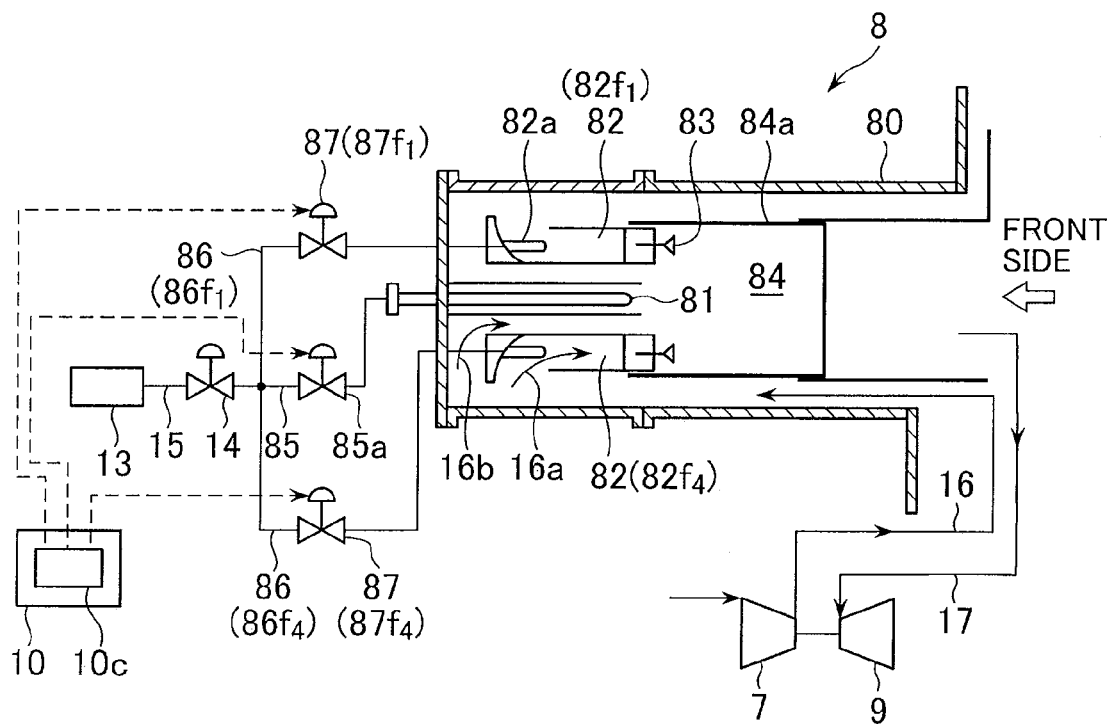
FIG. 4A is an outline cross sectional view of the combustor.
Figure 4B:
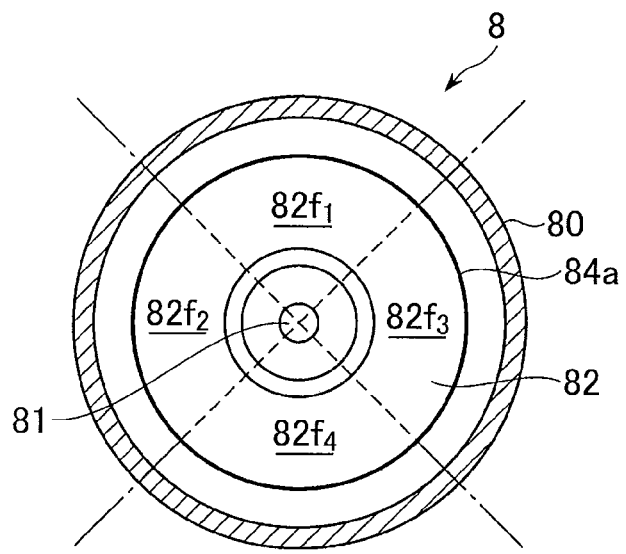
FIG. 4B is a front view of the combustor shown in FIG. 4A and viewed from a front side of the combustor.

Referring to FIGS. 4A and 4B, the combustor 8 includes a combustor cover 80 and a diffusion pilot burner 81. The combustor cover 80 has a cylindrical shape with one end thereof closed. The diffusion pilot burner 81 used for diffusion combustion is located in a central inner space of the combustor cover 80.

The combustor 8 also has a premix burner 82 circularly arranged around the outer circumference of the diffusion pilot burner 81. In other words, the premix burner 82 surrounds the outer circumference of the diffusion pilot burner 81. The premix burner 82 is used for premixed combustion and includes a plurality of combustion nozzles 82a and a plurality of flame holders 83. The combustor 8 also has a combustor liner 84a extending along the inner circumference of the combustor cover 80 to form a combustion chamber 84.

A front side of the combustor 8 is regarded as the side on which the combustion chamber 84 is located.

The compressed air 16 flows from the compressor 7 through a path formed between the combustor liner 84a and the combustor cover 80. The compressed air 16 is then divided into compressed air 16a and compressed air 16b. The compressed air 16b is supplied to the diffusion pilot burner 81, and the compressed air 16a is supplied to the premix burner 82.

The combustor 8 also has a diffusion fuel system 85 and a premix fuel system 86. The fuel 15 is supplied from the fuel supply source 13 through the fuel control valve 14 to the combustor 8. Specifically, the fuel 15 that flows from the fuel supply source 13 through the fuel control valve 14 is introduced into both the diffusion fuel system 85 and the premix fuel system 86. Then, the fuel 15 introduced into the diffusion fuel system 85 is supplied to the diffusion pilot burner 81. The fuel 15 introduced into the premix fuel system 86 is supplied to the premix burner 82.

The diffusion fuel system 85 has a flow rate control valve 85a that controls the amount of the fuel 15 to be supplied to the diffusion pilot burner 81. The flow rate control valve 85a is connected to the switching controller 10c included in the gas generator controller 10. The switching controller 10c transmits a control signal to the diffusion fuel system 85 to control the opening degree of the flow rate control valve 85a.

The premix fuel system 86 has a flow rate control valve 87 that controls the amount of the fuel 15 to be supplied to the premix burner 82. The flow rate control valve 87 is connected to the switching controller 10c included in the gas generator controller 10. The switching controller 10c transmits a control signal to the premix fuel system 86 to control the opening degree of the flow rate control valve 87.

The premix burner 82 includes four combustion regions $82f_1$, $82f_2$, $82f_3$ and $82f_4$ in which the premixed combustion is to be carried out. When the premix burner 82 included in the combustor 8 according to the present embodiment is viewed from the front side of the combustor 8 (or from the side of the combustion chamber 84) as shown in FIG. 4B, the four combustion regions $82f_1$, $82f_3$, $82f_4$ and $82f_2$ are arranged in this order from the upper side of the combustor 8 in the clockwise direction surrounding the outer circumference of the diffusion pilot burner 81. The areas of the four combustion regions are substantially equal to each other.

The premixed combustion can be carried out separately in each of the combustion regions $82f_1$, $82f_2$, $82f_3$ and $82f_4$.

The premix fuel system 86 shown in FIG. 4A includes four premix fuel systems $86f_1$, $86f_2$, $86f_3$ and $86f_4$. The four premix fuel systems $86f_1$, $86f_2$, $86f_3$ and $86f_4$ are capable of supplying the fuel 15 to the respective combustion regions $82f_1$, $82f_2$, $82f_3$ and $82f_4$.

Each of the premix fuel systems $86f_1$, $86f_2$, $86f_3$ and $86f_4$ has its corresponding flow rate control valve $87f_1$, $87f_2$, $87f_3$ or $87f_4$ respectively. FIG. 4 shows the premix fuel systems $86f_1$, $86f_4$ and the flow rate control valves $87f_1$, $87f_4$.

With the combustor 8 configured described above, when the fuel 15 is supplied to the diffusion pilot burner 81, the fuel 15 and the compressed air 16b are mixed and burned by the diffusion burner 81 in the combustion chamber 84. In this way, diffusion combustion is carried out in the combustion chamber 84.

When the fuel 15 is supplied to the premix burner 82 through the combustion nozzles 82a, the fuel 15 and the compressed air 16a are mixed (premixed) in the premix burner 82 and then burned in the combustion chamber 84. In this way, premixed combustion is carried out in the combustion chamber 84.

In the combustor 8 according to the present embodiment, both the diffusion combustion by the diffusion pilot burner 81 and the premixed combustion by the premix burner 82 can be carried out simultaneously.

The premix burner 82 is capable of separately supplying the fuel 15 to each of the combustion regions $82f_1$ to $82f_4$. The premixed combustion can be carried out separately in each of the combustion regions $82f_1$ to $82f_4$ when the fuel 15 is supplied to the combustion region.

When the switching controller 10c selects at least one of the combustion regions $82f_1$ to $82f_4$ to which the fuel 15 is supplied, the premixed combustion starts in the selected combustion region or starts separately in each of the selected combustion regions.

In order to start the premixed combustion in the combustion region $82f_1$, the switching controller 10c controls the flow rate control valve $87f_1$ such that the flow rate control valve $87f_1$ is open to supply the fuel 15 to the combustion region $82f_1$. In order to start the premixed combustion in the combustion regions $82f_1$ and $82f_2$, the switching controller 10c controls the flow rate control valves $87f_1$ and $87f_2$ such that the flow rate control valves $87f_1$ and $87f_2$ are open to supply the fuel 15 to the combustion regions $82f_1$ and $82f_2$.

In the combustor 8, the premixed combustion can start separately in each of the combustion regions $82f_1$ to $82f_4$.

Before the premixed combustion starts in the combustor 8 included in the two-shaft gas turbine 1 shown in FIG. 1, the gas generator controller 10 controls the combustor 8 to carry out the diffusion combustion and form a stable flame by means of the diffusion pilot burner 81 until the load L is increased from zero to a certain level.

When the load L is increased to the certain level by the diffusion combustion carried out in the combustor 8, the gas generator controller 10 controls the combustor 8 to start the premixed combustion by means of the premix burner 82 so as to suppress generation of NOx.

When the premix burner 82 includes a plurality of combustion regions, for example, the four combustion regions $82f_1$ to $82f_4$ as shown in FIG. 4B, the gas generator controller 10 selects at least one of the combustion regions $82f_1$ to $82f_4$ on the basis of the load L applied to the two-shaft gas turbine 1 to allow the premixed combustion to be carried out in the selected combustion region or regions. The gas generator controller 10 controls the combustor 8 such that the premixed combustion starts in the selected combustion region or starts separately in each of the selected combustion regions. Further, the gas generator controller 10 controls the start of the premixed combustion in the combustor 8 such that the number of the selected combustion regions in which the premixed combustion is to be carried out is increased with the increase in the load L. In this way, the gas generator controller 10 appropriately suppresses generation of NOx.

Starting the diffusion combustion for the start of the premixed combustion in the combustor 8, and increasing the number of the combustion regions (in which the premixed combustion is carried out) selected from the combustion regions $82f_1$ to $82f_4$, are hereinafter called "changing of the operational state of the combustor 8". A point at which the operational state of the combustor 8 is changed is hereinafter called "a change point".

In a one-shaft gas turbine, since the rotational rate of a rotary shaft is constant regardless of a load, the amount A of air that is to be introduced into a combustor can be constant in the one-shaft gas turbine. Therefore, a controller that controls the combustor included in the one-shaft gas turbine changes the operational state of the combustor on the basis of the amount F (that varies according to the load) of fuel that is to be introduced into the combustor, thereby appropriately suppressing generation of NOx.

However, the two-shaft gas turbine 1 shown in FIG. 1 controls the amount A of the compressed air (that is to be introduced into the combustor 8) based on the rotational rate $\omega$ of the gas generator shaft 18. The rotational rate $\omega$ of the gas generator shaft 18 is changed on the basis of the load L. If the gas generator controller 10 changes the operational state of the combustor 8 on the basis of the amount F of the fuel that is to be introduced into the combustor 8, a flame may be extinguished.

To avoid this, appropriate fuel-air ratios ($FA_1$ to $FA_4$) are preset in the two-shaft gas turbine 1 according to the present embodiment, and the gas generator controller 10 changes the operational state of the combustor 8 based on the fuel-air ratio (F/A) that varies according to the load L.

Figure 5:
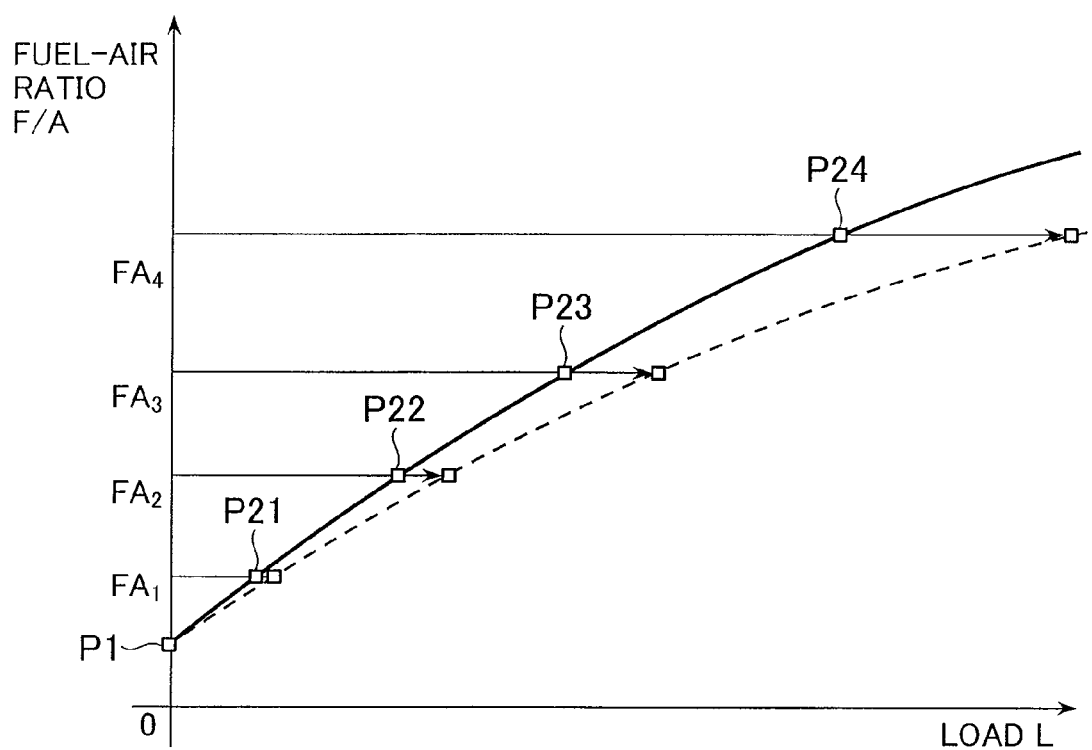
FIG. 5 is a graph showing an example of the relationship between the load and the ratio of the amount of the fuel that is to be introduced into the combustor to the amount of the air that is to be introduced into the combustor.

As shown in FIG. 5, a change point P1 is set when the load L is zero. When the load L is zero, the low-pressure turbine 4 rotates at a rotational rate that is approximately 30% of rated rotational speed, for example. At the change point P1, the switching controller 10c included in the gas generator controller 10 shown in FIG. 4A controls the combustor 8 to start the diffusion combustion by means of the diffusion pilot burner 81 included in the combustor 8.

Specifically, at the change point P1, the switching controller 10c controls the flow rate control valve 85a such that the flow rate control valve 85a is open to supply the fuel 15 to the diffusion pilot burner 81.

At the change point P1, the opening degree of the fuel control valve 14 is set such that the amount F of the fuel, which is set in the graph shown in FIG. 2A when the load L is zero, is to be introduced into the combustor 8.

When the diffusion combustion starts in the combustor 8, the load L is increased. Then, the fuel controller 10a included in the gas generator controller 10 references the graph shown in FIG. 2A to calculate the amount F of the fuel 15 on the basis of the load L and the atmospheric temperature T.

In addition, the IGV opening degree controller 10b references the graph shown in FIG. 3A to calculate the amount A of the compressed air 16 on the basis of the load L, the atmospheric temperature T and the rotational rate $\omega$ of the gas generator shaft 18.

Furthermore, the switching controller 10c included in the gas generator controller 10 calculates the fuel-air ratio (F/A) on the basis of the calculated amount F of the fuel 15 and the calculated amount A of the compressed air 16.

The fuel-air ratio (F/A) is increased with the increase in the load L. When the fuel-air ratio (F/A) reaches the preset fuel-air ratio $FA_1$, the switching controller 10c controls the flow rate control valve 87$f_1$ included in the premix fuel system 86$f_1$ such that the flow rate control valve 87$f_1$ is open to supply the fuel 15 to the combustion region 82$f_1$ included in the premix burner 82.

After the fuel 15 is supplied to the combustion region 82$f_1$, the premixed combustion starts in the combustion region 82$f_1$ included in the premix burner 82.

The preset fuel-air ratio $FA_1$ is a ratio corresponding to a change point P21 at which the premixed combustion starts in the combustion region 82$f_1$ included in the premix burner 82.

The preset fuel-air ratio $FA_1$ may be predetermined by an experiment or the like and set as a fuel-air ratio (F/A) that is appropriate for starting the premixed combustion in the combustion region 82$f_1$ included in the premix burner 82.

When the two-shaft gas turbine 1 starts the premix combustion in the combustion region 82$f_1$ included in the premix burner 82, the load L is further increased. Then, the fuel controller 10a included in the gas generator controller 10 calculates the amount F of the fuel on the basis of the load L and the atmospheric temperature T. The IGV opening degree controller 10b included in the gas generator controller 10 calculates the amount A of the compressed air on the basis of the load L, the atmospheric temperature T and the rotational rate $\omega$ of the gas generator shaft 18. The switching controller 10c included in the gas generator controller 10 calculates the fuel-air ratio (F/A) on the basis of the calculated amounts F and A.

When the fuel-air ratio (F/A) is increased to the preset fuel-air ratio $FA_2$, the switching controller 10c controls the flow rate control valve 87$f_2$ included in the premix fuel system 86$f_2$ such that the flow rate control valve 87$f_2$ is open to supply the fuel 15 to the combustion region 82$f_2$ included in the premix burner 82.

After the fuel 15 is supplied to the combustion region 82$f_2$, the premixed combustion starts in the combustion region 82$f_2$ included in the premix burner 82.

The preset fuel-air ratio $FA_2$ is a ratio corresponding to a change point 22 at which the premixed combustion starts in the combustion region 82$f_2$ included in the premix burner 82.

The preset fuel-air ratio $FA_2$ may be determined by an experiment or the like and set as a fuel-air ratio (F/A) that is appropriate for starting the premix combustion in the combustion region 82$f_2$ included in the premix burner 82.

When the fuel-air ratio (F/A) reaches the preset fuel-air ratio $FA_3$, the switching controller 10c controls the flow rate control valve 87$f_3$ included in the premix fuel system 86$f_3$ such that the flow rate control valve 87$f_3$ is open to supply the fuel 15 to the combustion region 82$f_3$ included in the premix burner 82. When the fuel-air ratio (F/A) reaches the preset fuel-air ratio $FA_4$, the switching controller 10c controls the flow rate control valve 87$f_4$ included in the premix fuel system 86$f_4$ such that the flow rate control valve 87$f_4$ is open to supply the fuel 15 to the combustion region 82$f_4$ included in the premix burner 82.

Then, the premixed combustion sequentially starts in the combustion regions 82$f_3$ and 82$f_4$ included in the premix burner 82.

The preset fuel-air ratio $FA_3$ is a ratio corresponding to a change point P23 at which the premixed combustion starts in the combustion region 82$f_3$ included in the premix burner 82. The preset fuel-air ratio $FA_3$ may be determined by an experiment or the like and set as a fuel-air ratio (F/A) that is appropriate for starting the premixed combustion in the combustion region 82$f_3$ included in the premix burner 82.

The preset fuel-air ratio $FA_4$ is a ratio corresponding to a change point P24 at which the premixed combustion starts in the combustion region 82$f_4$ included in the premix burner 82. The preset fuel-air ratio $FA_4$ may be determined by an experiment or the like and set as a fuel-air ratio (F/A) that is appropriate for starting the premixed combustion in the combustion region 82$f_4$ included in the premix burner 82.

When the premixed combustion starts in all the combustion regions 82$f_1$ to 82$f_4$, the rotational rate of the output turbine shaft 6 of the low-pressure turbine 4 reaches the rated rotational speed. Thus, the two-shaft gas turbine 1 is capable of operating in a rated range.

When the change points P21 to P24 (at which the operational state of the combustor 8 is changed) are set on the basis of the respective fuel-air ratios (F/A), the premixed combustion can starts in the combustion regions $82f_1$ to $82f_4$ under the condition that the fuel-air ratios (F/A) are appropriate for the premixed combustion. This can suppress such a problem as extinction of a flame.

When the relationship between the load L and the fuel-air ratio (F/A) is represented by a broken line shown in FIG. 5, the change points P21 to P24 are shifted to points present on the broken line without changing in the preset fuel-air ratios $FA_1$ to $FA_4$.

Even when the fuel-air ratio (F/A) is increased with the increase in the load L as shown by the broken line of FIG. 5, the gas generator controller 10 changes the operational state of the combustor 8 when the fuel-air ratio (F/A) is equal to any of the preset fuel-air ratios $FA_1$ to $FA_4$.

Therefore, the gas generator controller 10 changes the operational state of the combustor 8 when the fuel-air ratio (F/A) is equal to any of the preset fuel-air ratios $FA_1$ to $FA_4$ regardless of how the load L and the fuel-air ratio (F/A) are changed. As described above, the preset fuel-air ratios $FA_1$ to $FA_4$ are appropriate for starting the premixed combustion in the respective combustion regions $82f_1$ to $82f_4$ included in the premix burner 82. In addition, the appropriate preset fuel-air ratios $FA_1$ to $FA_4$ suppress the fact that a flame is extinguished when the premixed combustion starts in the combustion regions $82f_1$ to $82f_4$ included in the premix burner 82.

When the premix burner 82 according to the present embodiment is viewed from the front side of the combustor 8 (or from the side of the combustion chamber 84) as shown in FIG. 4B, the four combustion regions $82f_1$, $82f_3$, $82f_4$ and $82f_2$ have areas substantially equal to each other, and are arranged in the order from the upper side of the combustor 8 in the clockwise direction surrounding the outer circumference of the diffusion pilot burner 81. In such a configuration, the premixed combustion initially starts in the upper combustion region $82f_1$, thereby reducing a deviation in the temperature distribution of the gas in the high-pressure turbine 9.

Starting the premixed combustion in the combustion regions $82f_1$, $82f_2$, $82f_3$ and $82f_4$ in this order appropriately suppresses generation of carbon monoxide (CO).

When the premixed combustion is carried out in one of the adjacent combustion regions, carbon monoxide is generated in a boundary space (in which the combustion is not carried out) between the adjacent two combustion regions. Thus, after the premixed combustion starts in the combustion region $82f_1$, the premixed combustion starts in the combustion region $82f_2$. This method reduces a boundary space between a region in which the premixed combustion is carried out and a region in which the premixed combustion is not carried out.

The change points P21 to P24 (at which the operational state of the combustor 8 is changed) are set in the two-shaft gas turbine 1 according to the present embodiment on the basis of the appropriate fuel-air ratios $FA_1$ to $FA_4$. The gas generator controller 10 changes the operational state of the combustor 8 at each of the change points P21 to P24.

Specifically, the switching controller 10c included in the gas generator controller 10 changes the operational state of the combustor 8 on the basis of the fuel-air ratio (F/A).

Each of the preset fuel-air ratios $FA_4$ to $FA_4$ that correspond to the respective change points P21 to P24 are appropriate for changing the operational state of the combustor 8. Therefore, the two-shaft gas turbine 1 is capable of suppressing a problem (such as extinction of a flame at each of the change points P21 to P24) caused by a change in the operational state of the combustor 8.

What is claimed is:

1. A two-shaft gas turbine comprising:
a compressor having an inlet guide vane on a compressor air intake, an opening degree of the inlet guide vane controlling an amount of air that is to be introduced into the compressor;
a combustor including a diffusion pilot burner for diffusion combustion and a plurality of premix burners for premixed combustion;
a plurality of premix burner fuel systems to supply fuel to the plurality of premix burners;
a high-pressure turbine connected to the compressor through a gas generator shaft and driven by a combustion gas formed in the combustor, the compressor being driven by the high-pressure turbine through the gas generator shaft which has a rotational rate;
an output turbine connected to an output turbine shaft driving a load device, and driven by the combustion gas discharged from the high-pressure turbine; and
a gas generator controller, wherein the gas generator controller stores a first relationship of an amount of fuel to a load of the compressor and an atmospheric temperature, a second relationship of an amount of air to the load of the compressor, the atmospheric temperature and the rotational rate of the gas generator shaft, and a third relationship between the amount of fuel and the amount of air, a first ratio of a reduction in the amount of fuel to an increase in the atmospheric temperature being greater than a second ratio of the reduction in the amount of air to the increase in the atmospheric temperature;
the gas generator controller comprising:
a fuel controller to calculate the amount of the fuel to be introduced into the combustor based on the load and the atmospheric temperature, and to control an opening degree of a fuel control valve in accordance with the first relationship such that the amount of the fuel is equal to the calculated amount;
an inlet guide vane opening degree controller to calculate an amount of air to be introduced into the combustor based on the load, the atmospheric temperature of the air and the rotational rate of the gas generator shaft, and to control the opening degree of the inlet guide vane, in accordance with the second relationship, such that the amount of air is equal to the calculated amount; and
a switching controller to calculate a fuel-air ratio based on the third relationship between the amount of the fuel calculated by the fuel controller and the amount of air calculated by the inlet guide vane opening degree controller, and to control the plurality of the premixed burner fuel systems based on the calculated fuel-air ratio.

* * * * *